(12) United States Patent
Frank

(10) Patent No.: US 11,807,468 B2
(45) Date of Patent: Nov. 7, 2023

(54) PACKAGING TRANSPORT DEVICE

(71) Applicant: Syntegon Packaging Systems AG, Beringen (CH)

(72) Inventor: Alexander Frank, Schaffhausen (CH)

(73) Assignee: Syntegon Packaging Systems AG, Beringen (CH)

(*) Notice: Subject to any disclaimer, the term of this patent is extended or adjusted under 35 U.S.C. 154(b) by 0 days.

(21) Appl. No.: 17/685,759

(22) Filed: Mar. 3, 2022

(65) Prior Publication Data
US 2022/0297950 A1 Sep. 22, 2022

(30) Foreign Application Priority Data
Mar. 17, 2021 (DE) .................... 10 2021 106 511.9

(51) Int. Cl.
*B65G 47/248* (2006.01)
*B65G 15/30* (2006.01)

(52) U.S. Cl.
CPC ........... *B65G 47/248* (2013.01); *B65G 15/30* (2013.01)

(58) Field of Classification Search
CPC .............................. B65G 47/248; B65G 15/30
See application file for complete search history.

(56) References Cited

U.S. PATENT DOCUMENTS

| | | |
|---|---|---|
| 5,791,451 A | 8/1998 | Brown |
| 9,027,731 B2* | 5/2015 | Peters ................. B65G 47/248 198/407 |
| 10,000,346 B2* | 6/2018 | Berdelle-Hilge .... B65G 47/965 |
| 2006/0231372 A1 | 10/2006 | von Freden |
| 2012/0325623 A1 | 12/2012 | Polling |

FOREIGN PATENT DOCUMENTS

| | | |
|---|---|---|
| DE | 102005017159 A1 | 11/2006 |
| DE | 202010001853 U1 | 5/2010 |
| JP | H09502687 A * | 3/1997 |

OTHER PUBLICATIONS

Borghi, ES 2908671 T3 (Year: 2022).*
Clossner, EP 3271274 B1 (Year: 2021).*
German Patent Office Search Report for Application No. 102021106511.9 dated Dec. 8, 2021 (12 pages including partial English translation).
European Extended Search Report and Written Opinion for Application No. 22162805.0 dated Aug. 26, 2022 (18 pages, including an English translation).

* cited by examiner

*Primary Examiner* — Gene O Crawford
*Assistant Examiner* — Lester Rushin, III
(74) *Attorney, Agent, or Firm* — Michael Best & Friedrich LLP

(57) ABSTRACT

A packaging transport device has a support unit (10) including a first support surface (12), which defines a first track section (11), and at least one second support surface (14), which defines a second track section (13) and is tilted relative to the first support surface (12) around a tilt axis (16) running in a transport direction (15), the packaging transport device further including a driving member (17) and drivers (18), which are connected with the driving member (17), and are supported movably around the tilt axis (16), wherein the driving member (17) is implemented by a belt.

20 Claims, 2 Drawing Sheets

PACKAGING TRANSPORT DEVICE

BACKGROUND

A packaging transport device with a support unit comprising a first support surface, which defines a first track section, and at least one second support surface, which defines a second track section and is tilted relative to the first support surface around a tilt axis running in a transport direction, has already been proposed.

SUMMARY

The invention is based on a packaging transport device with a support unit comprising a first support surface, which defines a first track section, and at least one second support surface, which defines a second track section and is tilted relative to the first support surface around a tilt axis running in a transport direction.

It is proposed that the packaging transport device comprises a driving member as well as drivers which are connected with the driving member and are supported movably around the tilt axis. By "drivers" are herein preferably elements to be understood which are configured for a positional securing, in particular on the driving member, of a product and/or in particular of a product container that is to be conveyed. The implementation of the packaging transport device according to the invention allows achieving a particularly easy oblique positioning of products and/or product containers as well as a positionally precise and reproducible transport. A transition between the support surfaces is easily realizable.

The drivers may herein be supported in such a way that they are tiltable around the tilt axis relative to the driving member, for example by way of special bearing points on the driving member, and/or especially advantageously the driving member itself is implemented so as to be rotatable, preferably rotatable around the tilt axis, and is rotated between the track sections. As a result, a simple support of the drivers on the driving member is achievable. Especially advantageously the drivers may be realized by individual rods. While the rods may herein be connected to the driving member via different connections which are deemed expedient by someone skilled in the art, they are especially advantageously connected to the driving member via plug connections.

Preferentially the driving member is rotated, between the track sections, around an axis that runs within the driving member and has a not insubstantial distance to both edges of the driving member. "Not insubstantial" is herein to mean more than 10% and preferably more than 20% of a maximum total width of the driving member. Very particularly preferentially the axis runs at least substantially coaxially with a core of the driving member, wherein "at least substantially coaxially" is to mean, in this context, having a deviation of less than 20% and particularly preferentially of less than 10% relative to a maximum total width of the driving member. An appropriate implementation allows at least largely reducing, especially advantageously completely avoiding, a position loss due to the rotation of the driving member.

The driving member may be realized by different members deemed expedient by someone skilled in the art, like for example by chains. However, especially advantageously the driving member is implemented by a belt, in particular a toothed belt, as a result of which an advantageous support of the drivers as well as advantageous support areas for products may be enabled by the driving member itself.

In a further implementation of the invention it is proposed that the driving member is embodied at least partially separately from the support unit, that it extends in the transport direction across the track sections, traversing the track sections in operation. In this way advantageous support surfaces, which in particular have a width that is independent from the driving member, are easily obtainable and the driving member can be implemented in a cost-efficient manner, which is in particular possible if the driving member is realized narrower than at least one of the support surfaces, which additionally enables easy rotatability. The support surfaces are realized at least partially so as to be contiguous and/or they may be realized by at least partially interrupted support sections.

Viewed transversally to the transport direction, the driving member may be arranged in different positions relative to the support surfaces, especially advantageously however, viewed transversally to the transport direction, the driving member is arranged at least substantially centrally with respect to at least one of the support surfaces, preferably centrally with respect to both support surfaces. By "at least substantially centrally'" is herein to be understood that a central axis of the driving member has a distance from a central axis of the support surface that runs in a transport direction, which is smaller than three times, preferably smaller than twice, a maximum total width of the driving member. By appropriate implementation it is possible to achieve easy tilting of the driving member, in particular advantageously around its core, and to achieve simple drivers, advantageously drivers realized mirror-symmetrically to a central axis of the driving member. However, principally it is also conceivable that, viewed transversally to the transport direction, the drivers protrude further beyond one side of the driving member than beyond an opposite-situated side.

In a further implementation of the invention it is proposed that a spacing is adjustable that is defined by the drivers, thus achieving a high degree of flexibility. For this purpose, different pre-defined positions may be given at the driving member, in which the drivers can be positioned in order to achieve different spacings; however, continuous adjustment may also be conceivable, for example if the drivers are fixable at the driving member in any required positions via a force-fit connection.

It is furthermore possible to augment flexibility of the device if the support unit comprises a bearing unit which is configured to support at least one of the support surfaces in such a way that it is adjustable in regard to its tilt angle. The support surface may herein be implemented so as to be manually adjustable or may be implemented so as to be adjustable by means of an actuator that is configured for an adjustment of the tilt angle of the support surface.

The packaging transport device according to the invention shall herein not be limited to the application and implementation described above. In particular, the invention also relates to driving members of the packaging transport device according to the invention and to a system with corresponding driving members, to a production machine, in particular a food filling machine and/or food packaging machine, with a corresponding packaging transport device and to a method for operating such a packaging transport device. Moreover, in order to fulfill a functionality that is described here, the packaging transport device according to the invention may comprise a number of individual elements, components and units as well as method steps that differs from a number given here. Furthermore, in regard to the value ranges given in the present disclosure, values situated within the limits mentioned shall also be considered to be disclosed and to be applicable according to requirements.

BRIEF DESCRIPTION OF THE DRAWINGS

Further advantages will become apparent from the following description of the drawing. In the drawing an exemplary embodiment of the invention is illustrated. The drawing, the description and the claims contain a plurality of features in combination. Someone skilled in the art will purposefully also consider the features separately and will find further expedient combinations.

It is shown in.

DETAILED DESCRIPTION

Figure 1:
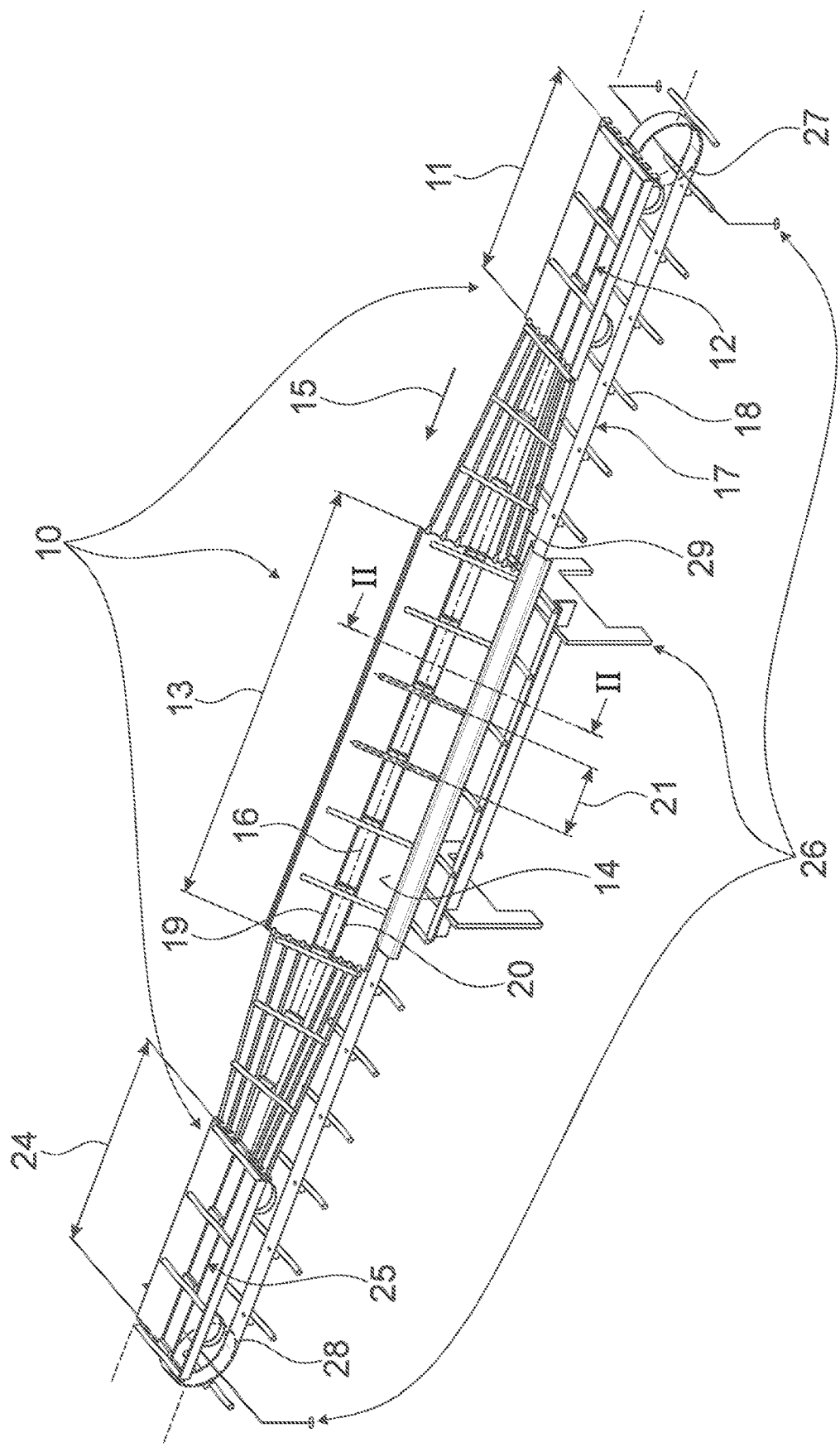
FIG. 1 a schematic illustration of a detail of a production machine with a packaging transport device according to the invention, and FIG. 2 a schematic sectional view along a line II-II indicated in FIG. 1.

FIG. 1 shows a schematic illustration of a detail of a production machine, in the present case a food packaging machine, with a packaging transport device.

The packaging transport device comprises a support unit 10 having a first support surface 12, which defines a first track section 11, a second support surface 14, which defines a second track section 13, and a third support surface 25, which defines a third track section 24. The second support surface 14 is tilted—relative to the first support surface 12 and to the third support surface 25—around a tilt axis 16 that runs in a transport direction 15.

The packaging transport device comprises a driving member 17, which is embodied by a toothed belt, and drivers 18 which are embodied by individual rods, which are connected to the driving member 17 via plug connections and which are supported movably around the tilt axis 16, this is realized by the driving member 17 being itself implemented so as to be rotatable around the tilt axis 16, and is in particular rotated around the tilt axis 16 between the track sections 11, 13.

The driving member 17 is rotated between the track sections 11, 13 around an axis running within the driving member 17, namely around the tilt axis 16, which has a distance to two edges 19, 20 of the driving member 17 and runs coaxially with a core of the driving member 17.

The driving member 17 is implemented separately from the support unit 10, extends in the transport direction 15 over the track sections 11, 13, 24 and traverses these track sections 11, 13, 24 in operation. The driving member 17 herein runs with the drivers 18 on the support surfaces 12, 14, 25.

During operation, in the track section 11, in which the first support surface 12 is realized having a horizontal extension, product containers are laid on which are not shown in detail. Viewing a certain portion of the driving member 17, which has traversed the track section 11 during operation, this certain portion is firstly rotated around the tilt axis 16 in a first direction, as a result of which the product containers laid thereon are tilted. In the second track section 13, in which the second support surface 14 is realized at a tilt relative to the first support surface 12, the product containers are loaded. When the certain portion of the driving member 17 has passed the second track section 13, this portion is rotated around the tilt axis 16 in a second direction back into its original position, whereupon the product containers laid thereon are tilted back into a horizontal orientation. In the third track section 24, in which the third support surface 25 is oriented horizontally, the product containers are once more oriented horizontally and are advantageously removable. In this way a transition from the first track section 11 with the horizontal first support surface 12 to the second track section 13 with the tilted second support surface 14 is easily realizable. Advantageously the product containers remain positioned between the drivers 18 in accordance with a spacing 21 given by the drivers 18. An error-prone synchronization can be avoided.

A drive of the driving member 17, which is not shown in detail, and a housing accommodating said drive are arranged with a fix orientation relative to form a schematically indicated mounting unit 26 of the packaging transport device and are not tilted with the driving member 17. Via the mounting unit 26, the support unit 10 is mounted on a floor together with its support surfaces 12, 14, 25. Furthermore, schematically shown deflection pulleys 27, 28, via which the driving member 17 is deflected, are mounted on the floor via the mounting unit 26. A tilting mechanism whose synchronization would take a huge effort, like in particular a synchronization of spindles and servomotors, can be avoided.

The driving member 17 is realized so as to be narrower than the support surfaces 12, 14, 25 and is—viewed transversally to the transport direction 15—arranged at least substantially centrally with respect to the support surfaces 12, 14, 25.

The spacing 21 defined by the drivers 18 is adjustable, that is individual drivers 18 can be removed; such that a spacing is achievable in which a distance between two drivers 18 is a multifold in comparison to the spacing 21, in which no drivers 18 have been removed. It is thus advantageously possible to achieve an adaption to product containers having different sizes.

Figure 2:
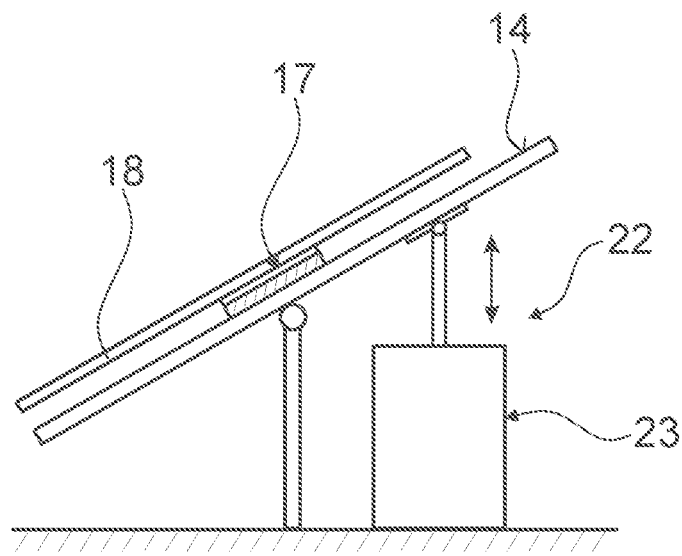

The support unit 10 furthermore comprises a bearing unit 22 (FIG. 2), which is configured to support the second support surface 14 in such a way that it is adjustable in its tilt angle. In order to enable at least semiautomated adjustment, the packaging transport device comprises an actuator 23, which is configured for the adjustment of the tilt angle of the second support surface 14. In order to facilitate an adjustability of the second support surface 14 of the support unit 10 relative to the first support surface 12 of the support unit 10 and to the third support surface 25, the parts of the support unit 10 that forms the support surfaces 12, 14, 25 are interconnected via elongate elements 29, which are supported movably relative to one another. The elongate elements 29 are distinguished by having an extension in their longitudinal direction that is by a multifold larger than their transversal extension. The longitudinal direction of the elongate elements 29 extends substantially parallel to the transport direction 15. Viewed transversally to the transport direction 15, the elongate elements 29 are arranged next to the driving member 17 and also form support surfaces for the product containers and for the drivers 18. The elongate elements 29 are implemented by rods, they could however also be implemented by different elongate elements which are deemed expedient by someone skilled in the art, like for example by tensioned flexurally soft elements, like ropes.

What is claimed is:

1. A packaging transport device with a support unit (10) comprising a first support surface (12), which defines a first track section (11), and at least one second support surface (14), which defines a second track section (13) and is tilted relative to the first support surface (12) around a tilt axis (16) running in a transport direction (15), the packaging transport device further comprising a driving member (17) and drivers (18) which are connected with the driving member (17) and are supported movably around the tilt axis (16), wherein the driving member (17) is implemented by a belt, wherein the drivers (18) are rods that extend beyond a width of the belt.

2. The packaging transport device according to claim 1, wherein the driving member (17) is implemented so as to be rotatable and is rotated between the track sections (11, 13).

3. The packaging transport device according to claim 2, wherein the driving member (17) is rotated, between the track sections (11, 13), around an axis that runs within the driving member (17) and has a not insubstantial distance to both edges (19, 20) of the driving member (17).

4. The packaging transport device according to claim 1, wherein the belt is a toothed belt.

5. The packaging transport device according to claim 1, wherein the driving member (17) is embodied at least partially separately from the support unit (10), that the driving member (17) extends in the transport direction (15) across the track sections (11, 13), traversing the track sections (11, 13) in operation.

6. The packaging transport device according to claim 5, wherein the driving member (17) is narrower than at least one of the support surfaces (12, 14).

7. The packaging transport device according to claim 6, wherein viewed transversally to the transport direction (15), the driving member (17) is arranged at least substantially centrally with respect to at least one of the support surfaces (12, 14).

8. The packaging transport device according to claim 1, wherein a spacing (21), which is defined by the drivers (18), is adjustable.

9. The packaging transport device according to claim 1, wherein the support unit (10) comprises a bearing unit (22), which is configured to support at least one of the support surfaces (14) in such a way that the at least one of the support surfaces (14) has an adjustable tilt angle.

10. The packaging transport device according to claim 9, comprising an actuator (23), which is configured for an adjustment of the tilt angle of the support surface (14).

11. A production machine with a packaging transport device according to claim 1, wherein the production machine is a food-filling machine and/or food-packaging machine.

12. A packaging transport device with a support unit (10) comprising a first support surface (12), which defines a first track section (11), and at least one second support surface (14), which defines a second track section (13) and is tilted relative to the first support surface (12) around a tilt axis (16) running in a transport direction (15), the packaging transport device further comprising a driving member (17) and drivers (18) which are connected with the driving member (17) and are supported movably around the tilt axis (16), wherein the driving member (17) is implemented by a belt, wherein the driving member (17) is implemented so as to be rotatable and is rotated between the track sections (11, 13).

13. The packaging transport device according to claim 12, wherein the driving member (17) is rotated, between the track sections (11, 13), around an axis that runs within the driving member (17) and has a not insubstantial distance to both edges (19, 20) of the driving member (17).

14. The packaging transport device according to claim 12, wherein the belt is a toothed belt.

15. The packaging transport device according to claim 12, wherein the driving member (17) is embodied at least partially separately from the support unit (10), that the driving member (17) extends in the transport direction (15) across the track sections (11, 13), traversing the track sections (11, 13) in operation.

16. The packaging transport device according to claim 15, wherein the driving member (17) is narrower than at least one of the support surfaces (12, 14).

17. The packaging transport device according to claim 16, wherein viewed transversally to the transport direction (15), the driving member (17) is arranged at least substantially centrally with respect to at least one of the support surfaces (12, 14).

18. A packaging transport device with a support unit (10) comprising a first support surface (12), which defines a first track section (11), and at least one second support surface (14), which defines a second track section (13) and is tilted relative to the first support surface (12) around a tilt axis (16) running in a transport direction (15), the packaging transport device further comprising a driving member (17) and drivers (18) which are connected with the driving member (17) and are supported movably around the tilt axis (16),
  wherein the driving member (17) is implemented by a belt, wherein the support unit (10) comprises a bearing unit (22), which is configured to support at least one of the support surfaces (14) in such a way that the at least one of the support surfaces (14) has an adjustable tilt angle, and
  wherein the packaging transport device further comprises an actuator (23), which is configured for an adjustment of the tilt angle of the support surface (14).

19. The packaging transport device according to claim 18, wherein the driving member (17) is implemented so as to be rotatable and is rotated between the track sections (11, 13).

20. The packaging transport device according to claim 19, wherein the driving member (17) is rotated, between the track sections (11, 13), around an axis that runs within the driving member (17) and has a not insubstantial distance to both edges (19, 20) of the driving member (17).

* * * * *